D. G. ANDREWS.
SAW JOINTING TOOL.
APPLICATION FILED MAY 6, 1910.

982,458.

Patented Jan. 24, 1911.

Witnesses:
H. H. Hunt.
J. H. Gurman.

Inventor:
Dorsey G. Andrews
By Albert H. Merrill
his atty.

UNITED STATES PATENT OFFICE.

DORSEY G. ANDREWS, OF LOS ANGELES, CALIFORNIA.

SAW-JOINTING TOOL.

982,458.   Specification of Letters Patent.   Patented Jan. 24, 1911.

Application filed May 6, 1910. Serial No. 559,833.

*To all whom it may concern:*

Be it known that I, DORSEY G. ANDREWS, a citizen of the United States, residing at Los Angeles, California, have invented a new and useful Saw-Jointing Tool, of which the following is a specification.

Among the objects of this invention are to provide a saw-jointing tool having, in combination with a guide for the blade of the saw, means for adjustably clamping the file with relation to said guide so that the file may be adjusted and then firmly secured with the face thereof at precisely right angles to the blade of the saw and therefore in position to joint the teeth of the saw accurately.

Another object is to provide a simpler, less expensive and less cumbersome tool of the character stated, and one that will be furnished with a loosely mounted clamping member for engaging the file, means being provided, however, to prevent the separation and loss of said clamping member.

These and other objects and advantages will hereinafter appear, in the claims and the description of the accompanying drawings which illustrate the invention.

Figure 1:
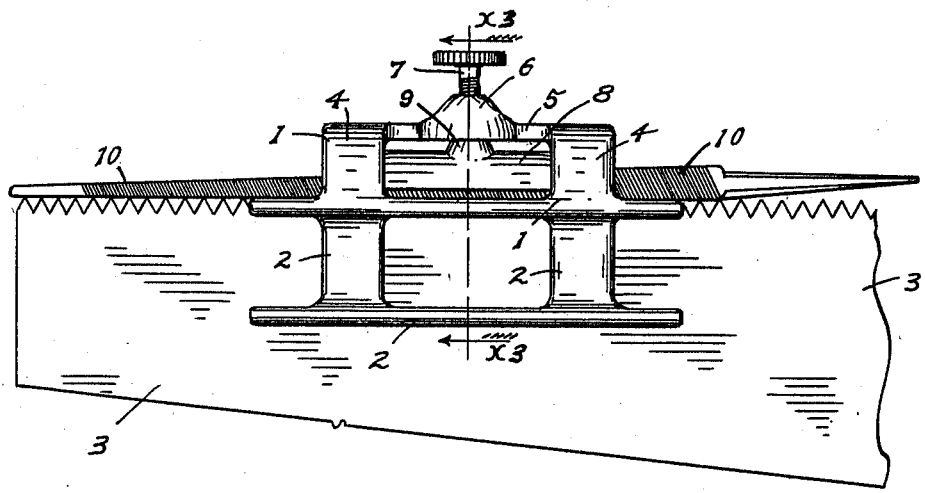
Figure 2:
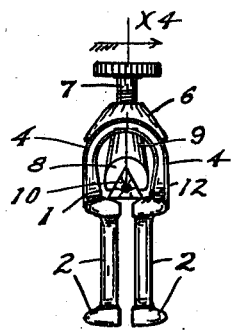
Figure 3:
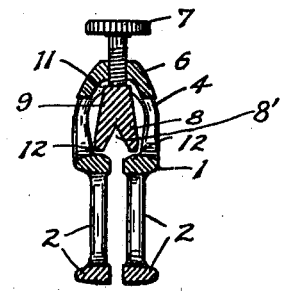
Figure 4:
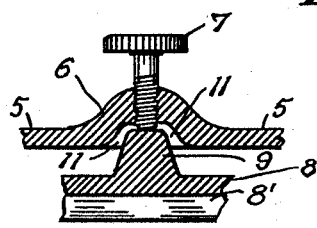

Referring to the drawings: Figure 1 is a side elevation of the tool showing a three-cornered file clamped therein and a portion of the blade of a saw in position for jointing. Fig. 2 is an end elevation looking at the left end of Fig. 1, the saw blade being omitted. Fig. 3 is a cross section on line $x^3$ of Fig. 1 the saw and file being omitted. Fig. 4 is an enlarged broken sectional detail on line $x^4$ of Fig. 2, the file being omitted.

Referring in detail to the drawings, the housing 1 is provided with a guide consisting of oppositely disposed downwardly extending wings or flat side-pieces 2 placed close together to embrace the saw blade 3. Said housing 1 is provided with a yoke 4 at each end and a bridge-piece 5 connecting said yokes and preferably formed integral therewith. The central portion of said bridge-piece is provided with a dome 6 having a central threaded bore to receive a clamping screw 7 which operates against the follower 8. Said follower 8 is provided with an upwardly extending lug 9 against which the end of screw 7 operates. This lug 9 has a flat top of somewhat greater diameter than the lower end of screw 7 but of considerably less diameter than the mouth of the recess 11 under dome 6. Said recess 11 is desirably circular and may be widened at its mouth as best shown in Fig. 4. The object of thus forming the lug 9 with relation to the recess 11 is to permit the follower 8 to be shifted somewhat from side to side as may be necessary to vary the transverse angle of the face of the file 10 to bring the same into correct relation to the teeth of the saw blade to joint the teeth accurately when the jointing tool is moved back and forth in the usual manner.

The bottom of the oval housing 1 is beveled at each side at 12 and may be at that point made somewhat wider than the file intended to be used so that by shifting the file toward one side or the other the angle of the face of the file may be varied with relation to the saw blade, but excellent results are secured by making the beveled portion of the housing of less width than the file and thus constructing the base of the housing so that the file will always assume a right angle with respect to the teeth of the saw.

The lug 9 is made just long enough to prevent the separation of the follower 8 from the rest of the tool.

It will be seen that the yokes 4, bridge-piece 5 and dome 6 constitute a frame open at each side within which is held the follower 8 having the retaining lug 9 that has room for lateral adjustment in recess 11 (see Fig. 4) under dome 6. In adjusting the angle of the follower and file the fingers of the operator may be inserted through the open sides of the frame to move the lug 9 of the follower toward one side or the other of the recess 11 before screwing down the screw 7.

The tool is desirably made of cast brass and nickel plated to prevent rusting.

The follower 8 may be provided with a triangular groove 8' extending along the lower face thereof to receive the triangular file shown.

I claim:

1. In a jointing tool, a guide to receive a saw blade, a housing to receive a file, a follower in said housing adapted to engage said file, and means independent of said follower to move the same toward the file, there being a lug on said follower and a recess in said housing into which said lug projects to prevent accidental separation of said follower from said housing, said lug remaining within said recess during movement of said follower toward and from the teeth of the saw.

2. In a jointing tool, a guide adapted to receive and slide along the toothed portion of a saw blade, a housing, a follower in said housing adapted to engage a file, said housing having a dome and said follower having a lug extending into said dome, and a screw working through the top of said dome to hold a file in position to engage the teeth of a saw blade.

3. In a jointing tool, a guide adapted to receive and slide along the toothed portion of a saw, a housing on said guide a follower in said housing, said housing having a dome and said follower having a lug projecting into said dome, said lug being of less diameter than the inside of said dome to permit the same to have lateral adjustability therein, and a screw working through the top of said dome, said housing having an inclined bottom portion along each side thereof to permit angular adjustment of a file.

4. In a jointing tool, a frame to receive a file, means to hold the toothed portion of a saw in position to engage said file, a follower within said frame, said follower having a lug projecting from the side thereof opposite the saw-holding means, a dome on said frame into which said lug projects, said dome being of greater internal diameter than the diameter of said lug, said frame having an open side to permit manual adjustment of said follower, and a clamping-screw working through the top of said dome against said lug.

In testimony whereof I have hereunto signed my name in the presence of two subscribing witnesses at Los Angeles, in the county of Los Angeles and State of California, this 30th day of April, 1910.

DORSEY G. ANDREWS.

Witnesses:
ALBERT H. MERRILL,
FLORA H. FOSS.